US011489721B2

(12) United States Patent
Jagannathan et al.

(10) Patent No.: US 11,489,721 B2
(45) Date of Patent: Nov. 1, 2022

(54) DYNAMIC COMPLIANCE MANAGEMENT

(71) Applicant: VMware, Inc., Palo Alto, CA (US)

(72) Inventors: Ravi Jagannathan, San Jose, CA (US); Carlos Phoenix, Hollywood, CA (US)

(73) Assignee: VMWARE, INC., Palo Alto, CA (US)

(*) Notice: Subject to any disclaimer, the term of this patent is extended or adjusted under 35 U.S.C. 154(b) by 0 days.

(21) Appl. No.: 17/028,112

(22) Filed: Sep. 22, 2020

(65) Prior Publication Data

US 2022/0094596 A1    Mar. 24, 2022

(51) Int. Cl.
*H04L 41/0813* (2022.01)
*H04L 9/40* (2022.01)
*G06N 20/00* (2019.01)
*G06N 5/04* (2006.01)

(52) U.S. Cl.
CPC .......... *H04L 41/0813* (2013.01); *G06N 5/04* (2013.01); *G06N 20/00* (2019.01); *H04L 63/20* (2013.01)

(58) Field of Classification Search
CPC ...... H04L 41/0813; H04L 63/20; G06N 20/00
USPC ........................................................ 709/221
See application file for complete search history.

(56) References Cited

U.S. PATENT DOCUMENTS

| | | | |
|---|---|---|---|
| 8,065,714 B2 | 11/2011 | Budko et al. | |
| 8,166,552 B2* | 4/2012 | Prafullchandra | G06Q 10/06 726/25 |
| 8,744,894 B2* | 6/2014 | Christiansen | G06Q 30/018 705/7.28 |
| 9,384,336 B1* | 7/2016 | Ashley | H04L 63/0263 |
| 9,692,789 B2* | 6/2017 | Kirti | H04L 63/1425 |
| 9,887,876 B2 | 2/2018 | Kumar et al. | |
| 9,967,350 B2 | 5/2018 | Rao | |
| 10,834,141 B1* | 11/2020 | Chud | H04L 63/107 |
| 10,897,424 B1* | 1/2021 | Dhanabalan | H04L 45/70 |
| 2006/0224742 A1* | 10/2006 | Shahbazi | H04W 12/37 709/226 |
| 2007/0130177 A1* | 6/2007 | Schneider | G06F 16/4393 |
| 2007/0207818 A1* | 9/2007 | Rosenberg | H04L 47/724 455/461 |
| 2012/0102543 A1* | 4/2012 | Kohli | H04L 63/20 726/1 |
| 2015/0172321 A1* | 6/2015 | Kirti | H04L 63/1425 726/1 |
| 2016/0197962 A1* | 7/2016 | Winn | H04L 63/0823 713/168 |
| 2016/0337193 A1* | 11/2016 | Rao | H04L 12/4641 |
| 2017/0331669 A1* | 11/2017 | Ganesh | H04L 41/0213 |

* cited by examiner

*Primary Examiner* — Tauqir Hussain
(74) *Attorney, Agent, or Firm* — Patterson & Sheridan, LLP

(57) ABSTRACT

The disclosure provides an approach for compliance management in a network. Embodiments include receiving, by a manager, a system health plugin. Embodiments include determining a configuration change for a network. Embodiments include receiving data indicating a current security posture of the network. Embodiments include determining an impact to the security posture of the network based on the configuration change. Embodiments include generating a notification relating to the impact to the security posture of the network. Embodiments include receiving a decision relating to the configuration change in response to the notification. Embodiments include performing an action based on the decision.

14 Claims, 4 Drawing Sheets

DYNAMIC COMPLIANCE MANAGEMENT

BACKGROUND

Software defined networking (SDN) comprises a plurality of hosts in communication over a physical network infrastructure, each host having one or more virtualized endpoints such as virtual machines (VMs), containers, or other virtual computing instances (VCIs) that are connected to logical overlay networks that may span multiple hosts and are decoupled from the underlying physical network infrastructure. Though certain aspects are discussed herein with respect to VMs, it should be noted that they may similarly be applicable to other suitable VCIs.

For example, any arbitrary set of VMs in a datacenter may be placed in communication across a logical Layer 2 network by connecting them to a logical switch. Each logical switch corresponds to a virtual network identifier (VNI), meaning each logical Layer 2 network can be identified by a VNI. The logical switch is collectively implemented by at least one virtual switch on each host that has a VM connected to the logical switch. The virtual switch on each host operates as a managed edge switch implemented in software by the hypervisor on each host. Forwarding tables at the virtual switches instruct the host to encapsulate packets, using a virtual tunnel endpoint (VTEP) for communication from a participating VM to another VM on the logical network but on a different (destination) host. The original packet from the VM is encapsulated at the VTEP with an outer IP header addressed to the destination host using a mapping of VM IP addresses to host IP addresses. At the destination host, a second VTEP decapsulates the packet and then directs the packet to the destination VM. Logical routers extend the logical network across subnets or other network boundaries using IP routing in the logical domain. The logical router is collectively implemented by at least one virtual router on each host or a subset of hosts. Each virtual router operates as a router implemented in software by the hypervisor on the hosts.

SDN generally involves the use of a management plane (MP) and a control plane (CP). The management plane is concerned with receiving network configuration input from an administrator or orchestration automation and generating desired state data that specifies how the logical network should be implemented in the physical infrastructure. The management plane may have access to a database application for storing the network configuration input. The control plane is concerned with determining the logical overlay network topology and maintaining information about network entities such as logical switches, logical routers, endpoints, etc. The logical topology information specifying the desired state of the network is translated by the control plane into network configuration data that is then communicated to network elements of each host. The network configuration data, for example, includes forwarding table entries to populate forwarding tables at virtual switch(es) provided by the hypervisor (i.e., virtualization software) deployed on each host. An example control plane logical network controller is described in U.S. Pat. No. 9,525,647 entitled "Network Control Apparatus and Method for Creating and Modifying Logical Switching Elements," which is fully incorporated herein by reference.

SDN environments are complicated distributed systems that contain various modules running on different platforms. A "platform" may refer to a virtualization infrastructure that is managed from a central point, such as a management plane, and includes various physical and virtual modules such as hosts, VCIs, logical switches, logical routers, services and the like. Services running within a platform may include software applications that perform various functions such as data collection and analysis, threat detection, and the like. In some cases, different platforms and different modules within an SDN environment may have differing and even conflicting security requirements. For instance, a platform may require a certain security standard while a service to be deployed on the platform may require a different security standard that is in conflict with the first security standard, such as a different version of the security standard. For example, the platform may require a first type of encryption while the server may require a second type of encryption that is more secure than the first type of encryption. If the first type of encryption is used, then the requirements for the service will not be met.

Managing compliance with various security requirements in an SDN environment is a challenging task. As such, there is a need in the art for improved techniques of dynamic compliance management in SDN environments.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for dynamic compliance management. In particular, techniques described herein involve a holistic analysis of the security posture of a distributed system in order to make determinations and recommendations related to compliance with various security requirements. The security posture of a system generally refers to the overall compliance of components in the system with security requirements applicable to the system.

Certain embodiments include a centralized compliance component that maintains a baseline security view of all systems and services in an SDN environment. For example, the compliance component may receive security requirements from the management plane as well as data from individual hosts and services in the network indicating implementation of the security requirements. In certain embodiments, the compliance component monitors for security compliance of the systems and services on an ongoing basis. Monitoring may include executing tests periodically and/or on demand. When a standard or requirement mandates a change in the system that may compromise the baseline security of a system or service, in certain embodiments, the compliance component raises a notification and may prevent the change from occurring in the system at least until a decision is received from an administrator. Upon receiving the notification, the administrator can approve or reject the change. If the administrator approves the change despite the determination that the change may compromise security, the baseline security of the system may adjust itself to a different state and raise a notification of which security requirements will be broken.

In certain embodiments, the compliance component can manage many different types of security requirements simultaneously through this centralized automated system. For example, the compliance component may manage compliance with governmental requirements such as Federal Risk and Authorization Management Program (FEDRamp) and general data protection regulation (GDPR) requirements, payment card industry (PCI) requirements, service organization control (SOC) requirements, internal product security requirements (PSR), and/or the like.

Figure 1:
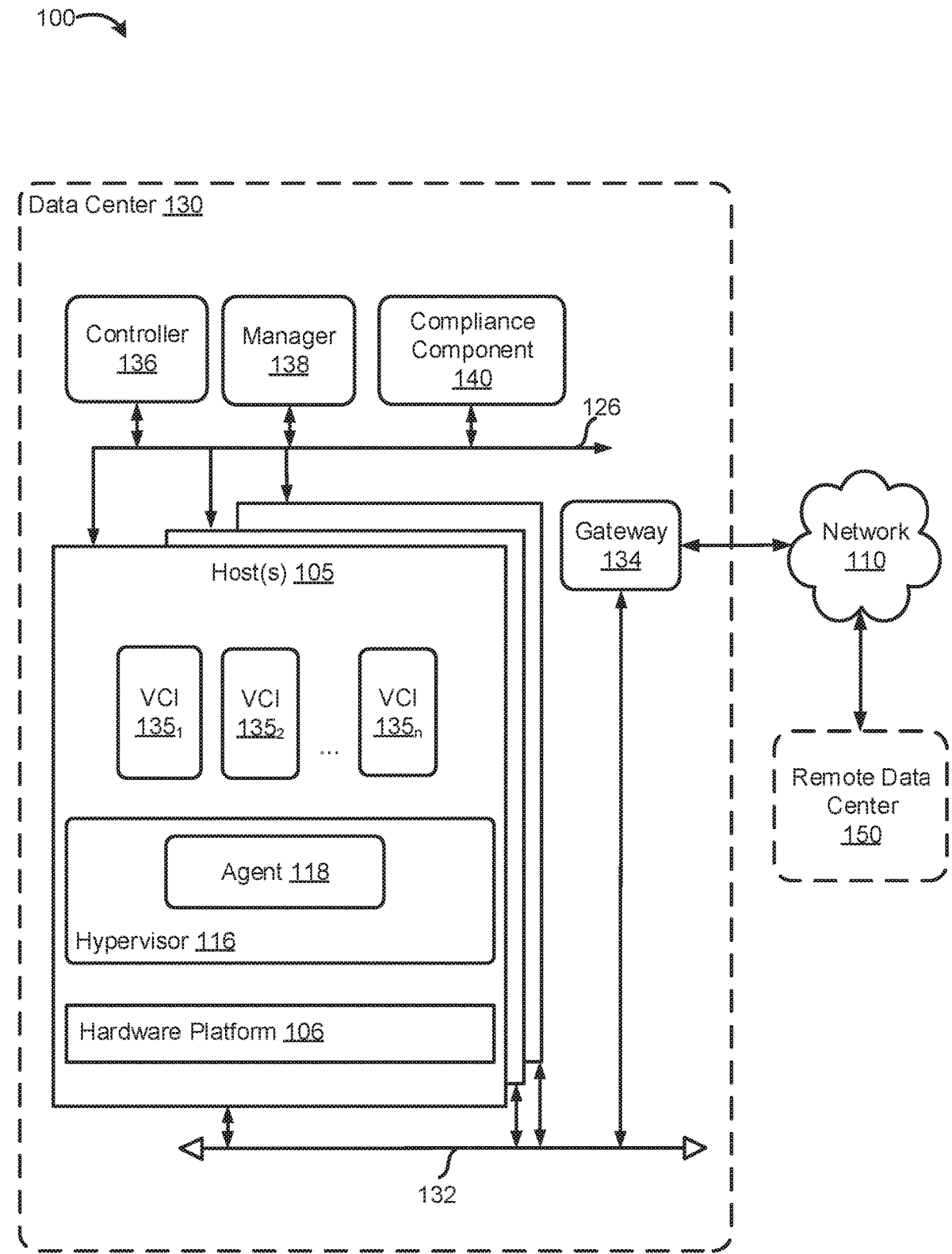
FIG. 1 depicts example physical and virtual network components with which embodiments of the present disclosure may be implemented.

FIG. 1 depicts example physical and virtual network components with which embodiments of the present disclosure may be implemented.

Networking environment 100 includes data center 130 connected to network 110. Network 110 is generally representative of a network of computing entities such as a local area network ("LAN") or a wide area network ("WAN"), a network of networks, such as the Internet, or any connection over which data may be transmitted.

Data center 130 generally represents a set of networked computing entities, and may comprise a logical overlay network. Data center 130 includes host(s) 105, a gateway 134, a data network 132, which may be a Layer 3 network, and a management network 126. Data network 132 and management network 126 may be separate physical networks or different virtual local area networks (VLANs) on the same physical network.

Each of hosts 105 may be constructed on a server grade hardware platform 106, such as an x86 architecture platform. For example, hosts 105 may be geographically co-located servers on the same rack or on different racks. Host 105 is configured to provide a virtualization layer, also referred to as a hypervisor 116, that abstracts processor, memory, storage, and networking resources of hardware platform 106 into multiple virtual computing instances (VCIs) $135_1$ to $135_n$ (collectively referred to as VCIs 135 and individually referred to as VCI 135) that run concurrently on the same host. VCIs 135 may include, for instance, VMs, containers, virtual appliances, and/or the like.

Hypervisor 116 may run in conjunction with an operating system (not shown) in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In certain aspects, hypervisor 116 implements one or more logical entities, such as logical switches, routers, etc. as one or more virtual entities such as virtual switches, routers, etc. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine. Although aspects of the disclosure are described with reference to VMs, the teachings herein also apply to other types of virtual computing instances (VCIs) or data compute nodes (DCNs), such as containers, which may be referred to as Docker containers, isolated user space instances, namespace containers, etc. In certain embodiments, VCIs 135 may be replaced with containers that run on host 105 without the use of a hypervisor.

Gateway 134 provides VCIs 135 and other components in data center 130 with connectivity to network 110, and is used to communicate with destinations external to data center 130 (not shown). Gateway 134 may be a virtual computing instance, a physical device, or a software module running within host 105.

Controller 136 generally represents a control plane that manages configuration of VCIs 135 within data center 130. Controller 136 may be a computer program that resides and executes in a central server in data center 130 or, alternatively, controller 136 may run as a virtual appliance (e.g., a VM) in one of hosts 105. Although shown as a single unit, it should be understood that controller 136 may be implemented as a distributed or clustered system. That is, controller 136 may include multiple servers or virtual computing instances that implement controller functions. Controller 136 is associated with one or more virtual and/or physical CPUs (not shown). Processor(s) resources allotted or assigned to controller 136 may be unique to controller 136, or may be shared with other components of data center 130. Controller 136 communicates with hosts 105 via management network 126.

Manager 138 represents a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In one embodiment, manager 138 is a computer program that executes in a central server in networking environment 100, or alternatively, manager 138 may run in a VM, e.g. in one of hosts 105. Manager 138 is configured to receive inputs from an administrator or other entity, e.g., via a web interface or API, and carry out administrative tasks for data center 130, including centralized network management and providing an aggregated system view for a user. According to embodiments of the present disclosure, manger 138 allows users to specify security requirements related to data center 130, and compliance with security requirements throughout data center 130 is managed by compliance component 140.

Compliance component 140 provides a centralized security solution that evaluates the security posture of data center 130. Compliance component 140 may run on a central server or may be distributed across one or more physical and/or virtual machines. In some embodiments, compliance component runs on one or more VCIs 135. In some embodiments, compliance component 140 scans and extracts various types of data from components of data center 130, including configurations data such as version of systems, protocols used, and relationships between components, such as architectural relationships. Architectural relationships may include, for example, numbers and types of virtualization managers, which hosts are managed by which components, numbers of virtual networks and connections among virtual networks, connections to other data centers, and/or the like. In certain embodiments, extracted data may include various configuration parameters (e.g., values assigned to configuration variables), which may be in the form of Boolean, numeric, and/or string values. Configuration parameters may generally include granular system settings that can be defined, such as password length, encryption cipher strength or required encryption techniques, firewall rules, and/or the like.

The extracted data may be translated into a data interchange format such as extensible markup language (XML), JavaScript object notation (JSON), resource description framework (RDF), or the like. A data interchange format generally comprises a structured format of data and associated metadata. Information in such a data interchange format may be compared with a desired security posture that is based on requirements applicable to components of data center 130. Requirements may come from a variety of sources, such as administrators, providers of services and products, governmental entities, and/or other regulatory entities. Requirements may include, for example, required values or ranges for configuration parameters and/or architectural relationships between components.

In some embodiments, compliance component 140 regularly determines whether potential compliance issues exist in the network or would be introduced by changes in the network based on comparing information in the data interchange format object to the desired security posture. In one example, compliance component 140 performs such a determination every time a change is proposed in the network that may impact the security posture of the network (e.g., a configuration change, an addition or deletion of an entity in the network, or the like) in order to determine whether the proposed change may raise an issue.

In one example, an administrator may attempt to deploy a particular service within data center 130, and the service may be associated with a requirement of utilizing secure hash algorithm (SHA) 384 encryption. Existing components in the data center 130 may utilize SHA 256 encryption, which uses less bits for hash values that complies with other requirements, such as governmental requirements. In this case, compliance component 140 updates a data interchange format object to reflect the proposed change, and compares the information in the data interchange format object to a desired security posture of the system that includes the requirement of the particular service. Based on this comparison, compliance component 140 determines the proposed change raises a potential compliance issue due to the fact that the service requires a different form of encryption than that currently utilized by other components in the system. As such, compliance component 140 may raise a notification of the potential compliance issue so that a user may determine whether to proceed with the change in view of the potential issue.

In some embodiments, compliance component 140 also recommends ways to mitigate or avoid potential compliance issues. For example, compliance component 140 may recommend that encryption throughout the network be changed to the more secure standard (e.g., SHA 384 rather than SHA 256). In another example, compliance component 140 may recommend that the service only be deployed on hosts that currently utilize the more secure standard. For example, if a first group of hosts utilize SHA 256 and a second group of hosts utilize SHA 384, then compliance component 140 may recommend that the service only be deployed on hosts in the second group and that it be excluded from hosts in the first group.

Decisions made by users with respect to changes may be recorded for future reference. For example, if an administrator decides to proceed with a particular change despite a potential compliance issue, compliance component 140 may record this decision with associated details (e.g., about the change and the potential issue, as well as the identity of the user that made the decision). Users may be prompted to provide explanations of decisions, which may also be recorded in association with the decisions for future reference. Recorded decisions and associated information may be used in evaluating future changes. For example, if an administrator repeatedly rejects a certain change, then when that particular change is proposed again in the future compliance component 140 may recommend that the administrator reject the change again based on the previous rejections. If the administrator provided one or more reasons for the earlier rejections, the one or more reasons may be presented to the administrator again when the change is subsequently proposed. In one example, historical decisions are archived and the data type is evaluated to produce many types of derivatives such as "rolling averages" where possible, or a count of Boolean values to arrive at an "on average" value, which may be used to compare to the current value. The more historical decision data is available, the higher the weighted average and the higher the confidence of data that is presented to the user.

Each change (e.g., each delta that impacts the security posture of the network) may be referred to as a design decision that may either be accepted or rejected. Tracking design decisions can help administrators identify when, why, and who made the system behave in a particular fashion. The design decisions can also be tracked and then monitored as they go through a ticket change management system, such as a software development management system or defect tracking system. Techniques described herein may allow customers to evaluate and adapt to changing requirements, such as by proactively alerting customers of potential audit failures if a system setting is not corrected and by pin-pointing where problems exist.

In some embodiments, machine learning techniques may be utilized when analyzing new changes in view of historical decisions. Machine learning techniques generally involve using a set of training inputs and training outputs to build a model that will output a value in response to inputs. Inputs may be described as "features". For example, each training data instance may include training data inputs or features (e.g., a signature, certain network events, file events, user information, process information, and/or the like associated with an alert) associated with a training data output or label (e.g., an indication of whether or not the alert is a false positive based on user feedback). A plurality of training data instances is used to train the model, such as by constructing a model that represents relationships between features and output values. In some embodiments, training involves providing training data inputs to the model and iteratively adjusting parameters of the model until the outputs from the model in response to the training data inputs match (or fall within a certain range of) the training data outputs associated with the training data inputs, or until a certain number of iterations have been completed without significant improvements in accuracy.

For example, a machine learning model may be trained using a training data set comprising features of past changes in the data center associated with labels indicating the decisions associated with the past changes (and, in some embodiments, the reasons given for the decisions). Features may include attributes, architectural relationships, and the like.

The trained model may be subjected to testing. Testing generally involves providing datapoints from a test dataset as inputs to the model, receiving labels as outputs, and verifying that the output labels match test labels. In some embodiments, a training data set generated based on past user decisions is split into training data and test data for use in the separate training and testing stages.

Various types of machine learning models known in the art may be utilized with embodiments of the present disclosure, such as a neural network, a decision tree, a random forest, a long short term memory (LSTM) model, a gradient boosting machine, a linear regression model, or the like.

Once trained, the model may be provided with features of a proposed change and may output a label indicating whether the change should be accepted or rejected (and, in some embodiments, a reason for the proposed acceptance or rejection). The output from the model may be used to provide a recommendation to a user and/or to take automated action, such as automatically accepting or rejecting a change.

Figure 2:
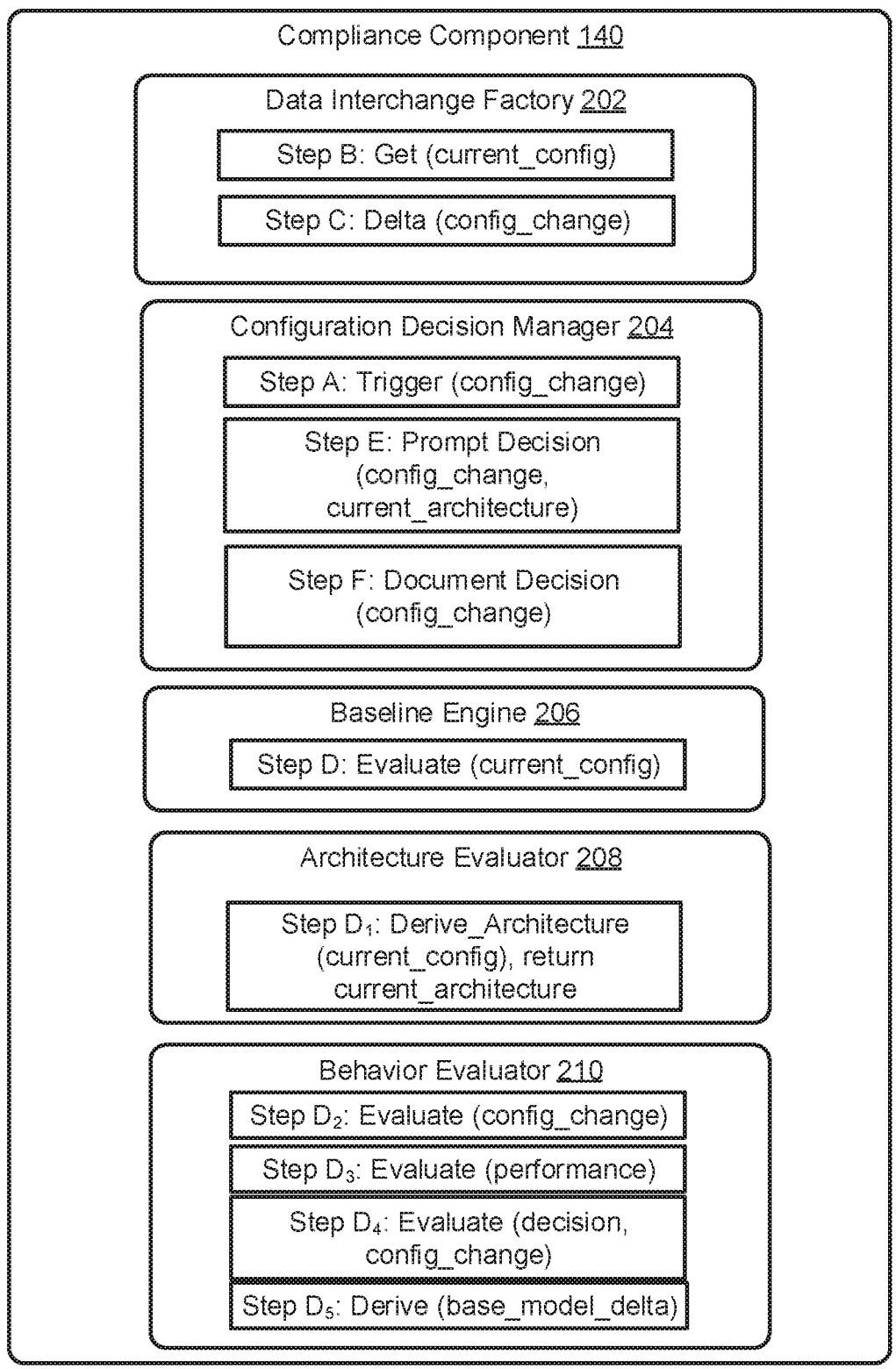
FIG. 2 depicts an example of dynamic compliance management according to embodiments of the present disclosure.

FIG. 2 is an illustration 200 of dynamic compliance management according to embodiments of the present disclosure. Illustration 200 depicts aspects of compliance component 140 of FIG. 1.

Compliance component 140 includes a data interchange factory 202 that performs operations related to acquiring data related to the security posture of a network, such as configuration parameters and configuration changes.

Compliance component 140 further includes a configuration decision manager 204 that performs operations related to prompting and recording decisions from users relating to changes in the network.

Compliance component 140 further includes a baseline engine 206 that performs operations related to acquiring data related to monitoring a baseline view of the security posture of a network.

Compliance component 140 further includes an architecture evaluator 208 that performs operations related to determining and analyzing architectural relationships in a network.

Compliance component 140 further includes a behavior evaluator 210 that performs operations related to evaluating configuration changes and the impact of decisions regarding configuration changes in the network.

One example is shown in illustration 200 as pseudocode steps A-F. At step A, configuration decision manager 204 triggers a configuration change analysis process. For example, the process may be triggered based on a determination that a configuration change has occurred or has been requested in the network, such as based on guest introspection or based on an alarm from a component related to the change.

At step B, data interchange factory 202 gets a current configuration of the network. For example, data interchange factory 202 may receive parameters and architectural relationships from the management plane and/or from various components throughout the network, and may convert the received information into a data interchange format object.

At step C, data interchange factory 202 determines a delta resulting from the configuration change determined at step A with respect to the current configuration determined at step B. The delta may represent an impact of the configuration change on the current configuration, such as changes to parameters and/or architectural relationships resulting from the configuration change.

At step D, baseline engine 206 evaluates the impact of the configuration change on the current configuration with respect to the security posture of the network. Evaluating the impact of the configuration change involves determining requirements applicable to the network, including any new requirements that may be introduced by the configuration change. Requirements may be determined through interaction with various components, such as the management plane and individual network entities such as services that may have their own requirements. In some embodiments, requirements may be retrieved from remote locations, such as web servers. In one example, governmental requirements are retrieved from a web server associated with a governmental entity. Compliance with the requirements is evaluated by comparing the requirements with a data interchange format object representing the configuration of the network after the configuration change. In some embodiments, the current configuration and the delta configuration are also used in evaluating the impact of the configuration change on compliance with requirements.

Step D further includes sub-steps $D_1$-$D_5$. At sub-step $D_1$, architecture evaluator 208 derives the architecture of the network based on the current configuration. This may include, for example, determining architectural relationships among components of the network. In some embodiments, architecture evaluator 208 stores historical architectures for reference.

At sub-step $D_2$, behavior evaluator 208 evaluates the configuration change in view of the security posture of the network, such as by determining whether the configuration change would result in an overall network configuration that complies with all requirements. At sub-step $D_3$, behavior evaluator 208 evaluates the performance of components in the network both before and, in some embodiments, after the configuration change. For example, behavior evaluator 208 may evaluate performance metrics such as throughput, latency, resource utilization, and the like, such as to determine whether there are any potential performance issues.

At sub-step $D_4$, behavior evaluator 208 evaluates the configuration change in view of historical decisions with respect to historical configuration changes. For instance, behavior evaluator 208 may utilize machine learning techniques to determine a recommended decision.

At sub-step $D_5$, behavior evaluator 208 derives a base model delta—meaning an overall change to the security posture of the network that will result from the configuration change in view of the various data points that have been evaluated To complete step D, baseline engine 206 may synthesize an impact of the configuration change on the security posture of the network in view of the architectural impact (e.g., whether the network will be structured in a way that complies with requirements) and the behavioral impact (e.g., whether the network will behave in a way that complies with requirements) in view of the requirements applicable to the network. Baseline engine 206 may determine whether to prompt a decision from the user based on whether there is a change to the security posture of the network in view of the configuration change.

At step E, configuration decision manager 204 prompts a decision from the user with respect to the configuration change in view of the current architecture of the network. In some embodiments, the user is presented with information relating to the impact of the configuration change on the security posture of the network, such as an explanation of why the configuration change may produce a compliance issue. In certain embodiments, the user is also provided with one or more recommendations related to the configuration change, such as a recommendation of whether to accept or reject the configuration change, historical explanations given for similar decisions, and/or recommended additional changes to the network to mitigate or avoid the potential compliance issue.

At step F, the decision received from the user is documented for future reference along with information related to the configuration change. The decision may be implemented, such as by allowing or blocking the configuration change and/or implementing additional changes requested by the user.

Figure 3:
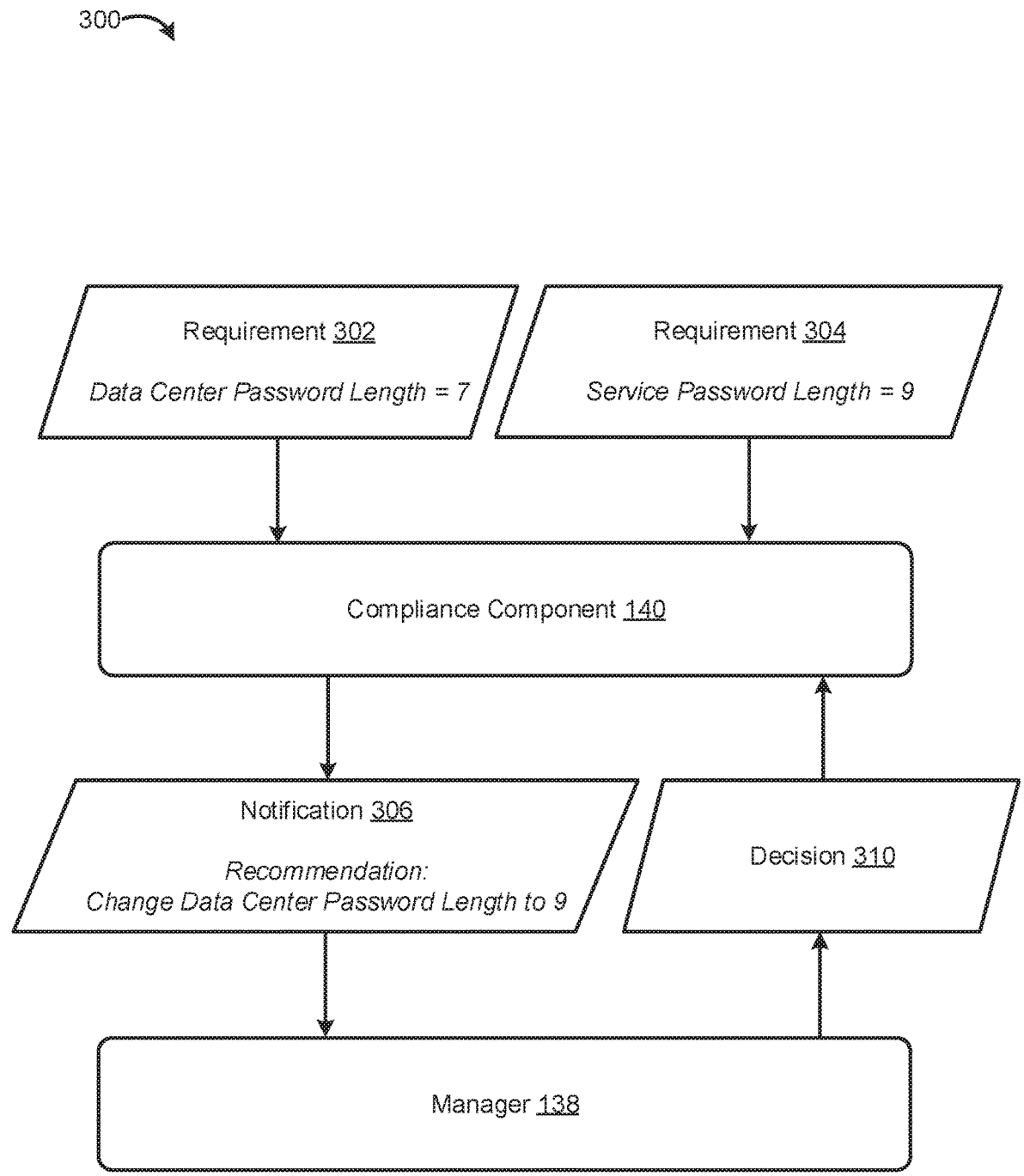
FIG. 3 depicts another example of dynamic compliance management according to embodiments of the present disclosure.

FIG. 3 is another illustration 300 of dynamic compliance management according to embodiments of the present disclosure. Illustration 300 includes compliance component 140 and manager 138 of FIG. 1.

Requirements 302 and 304 are received by compliance component 140. Requirement 302 indicates that the password length for the data center must be at least 7 characters while requirement 304 indicates that the password length for a particular service must be at least 9 characters. In one example, requirement 302 is specified by a developer of the virtualization infrastructure utilized in the data center and requirement 304 is specified by a developer of the particular service. A configuration change analysis process by compliance component 140 such as that described above with respect to FIG. 3 is triggered when a configuration change is detected, such as when a user requests to deploy the particular service in the data center.

Compliance component 140 determines that deploying the particular service in the data center may raise a compliance issue, as the password length for the data center is lower than that required by the service. Compliance component 140 provides a notification 306 to manager 138 indicating that there is a potential compliance issue and requesting a decision. Notification 306 includes a recommendation to change the data center password length to be at least 9 characters to ensure that requirement 304 is met throughout the data center.

The user provides a decision 310 in response to notification 306. For example, decision 310 may be to either accept or reject the deployment of the particular service and/or to make one or more additional changes, such as that recommended in notification 306. Compliance component 140 may document the decision with associated information for future reference. The decision may be implemented, such as by manager 138, by allowing or blocking the configuration change and/or by making additional changes indicated in decision 310. For example, if decision 310 indicates to accept the deployment of the particular service and to change the password length for the data center to 9 characters, then manager 138 may perform operations to allow the deployment and make the change to the data centers password length.

Figure 4:
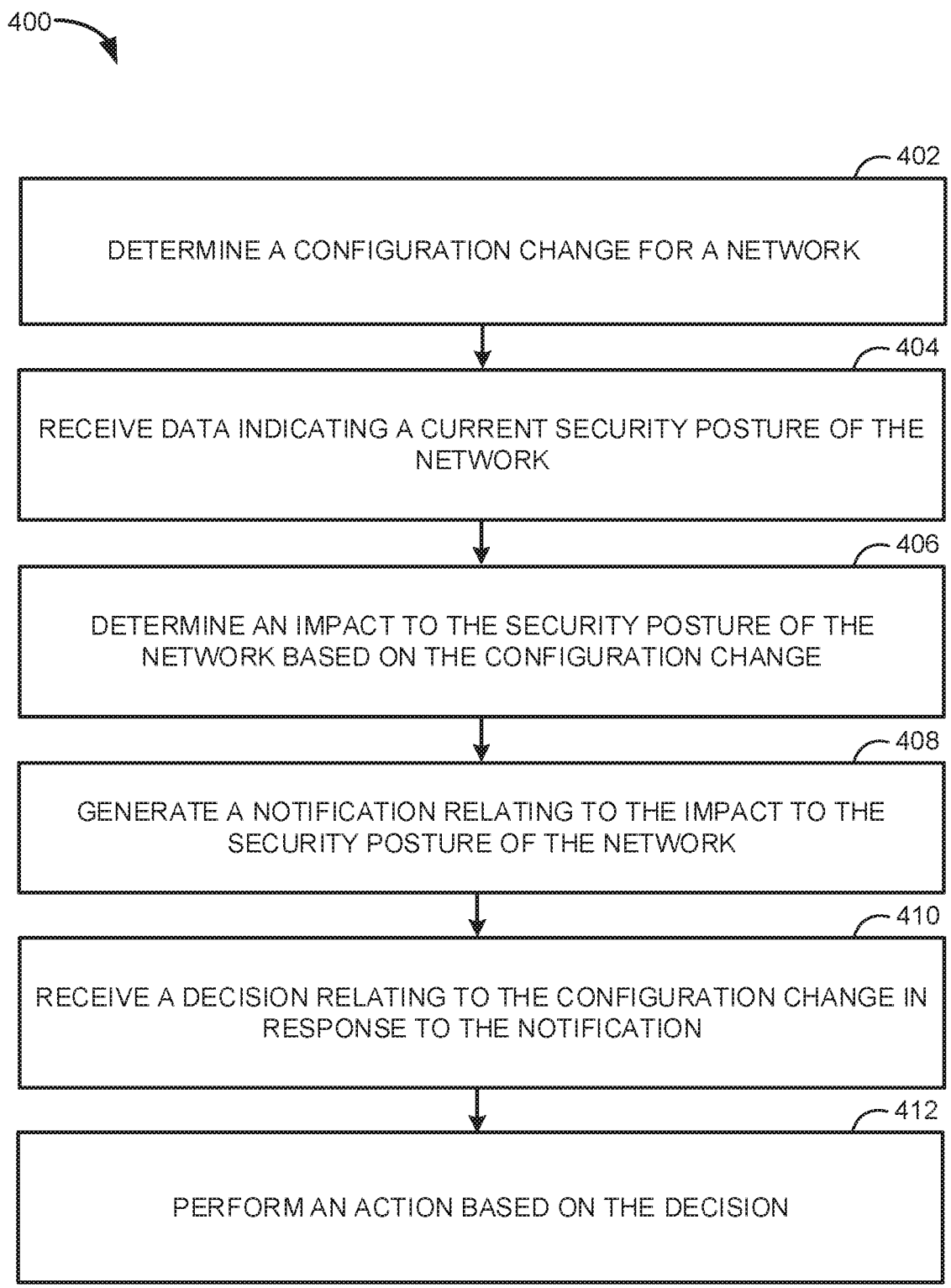
FIG. 4 depicts example operations for dynamic compliance management according to embodiments of the present disclosure.

FIG. 4 depicts example operations 400 for dynamic compliance management according to embodiments of the present disclosure. For example, operations 400 may be performed by compliance component 140 of FIG. 1.

At 402, a configuration change for a network is determined. For example, compliance component 140 of FIG. 1 may determine the configuration change by querying one or more components in the network, such as via guest introspection. Guest introspection generally refers to techniques for retrieving information from within a VCI (e.g., running a guest operating system), such as via an agent located in the VCI that communicated with a component that is external to the VCI, such as compliance component 140. In some embodiments, guest introspection is performed without the use of an agent. For example, guest introspection may involve sharing the runtime and memory space of the hypervisor itself to avoid the need for a separate process that intervenes within the VCI. For example, guest introspection may enable the hypervisor to perform higher level tasks, such as deconstructing network packets and analyzing digital signatures in comparison with known threats. It may also be used to embed firewalls as if they were part of the host, when in fact they are applied and managed via the hypervisor. In other embodiments, compliance component 140 of FIG. 1 determines the configuration change via an alert raised by one or more components in the network. For example, an agent on a host may raise an alert when a configuration change is detected for the host, and the alert may be received by compliance component 140. The configuration change may be the addition or removal of an entity such as a system or service, an architectural change, an addition or removal of a requirement, or the like. The configuration change may have been requested and may be pending a verdict from compliance component 140 of FIG. 1, or may have already occurred.

At 404, data indicating a current security posture of the network is determined. For example, compliance component 140 of FIG. 1 may receive data from various sources indicating parameters and architectural relationships in the network, and may maintain this data in a data interchange format object.

At 406, an impact to the security posture of the network is determined based on the configuration change. For example, compliance component 140 of FIG. 1 may determine a delta between the current configuration and the configuration that would result from enacting the configuration change. In some embodiments, compliance component 140 of FIG. 1 compares the resulting configuration to one or more requirements applicable to the network to determine whether the configuration change would result in any compliance issues.

At 408, a notification relating to the impact to the security posture of the network is generated. For example, compliance component 140 of FIG. 1 may send a notification to the management plane indicating a potential compliance issue and requesting a decision regarding whether to allow or block the configuration change. In some embodiments, one or more recommendations are also provided with the notification.

At 410, a decision relating to the configuration change is received in response to the notification. For example, an administrator may provide a decision as to whether to allow or block the configuration change and/or whether to perform additional changes in the network to address potential compliance issues that may result.

At 412, an action is performed based on the decision. For example, compliance component 140 of FIG. 1 may record the decision and associated information, such as details of the configuration change and the user that issued the decision, for future reference. In some embodiments, the decision is implemented, such as by allowing or blocking the configuration change and/or by performing one or more additional changes indicated in the decision.

Techniques described herein constitute an improvement over existing compliance management techniques. For example, by managing compliance from a central location in a network rather than on individual modules in the network, embodiments of the present disclosure allow for a holistic view of the security posture of the entire network to be monitored in view of ongoing configuration changes that are requested. Embodiments described herein allow compliance with potentially large numbers of requirements from various different sources to be automatically managed in a way that would not be possible in a manual or ad-hoc manner.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and/or the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of compliance management, comprising:
   determining, by a compliance component in a network, a proposed configuration change for the network, wherein the network comprises a plurality of computing components;
   prior to modifying the network based on the proposed configuration change:
   receiving, by the compliance component, data indicating a current security posture of the network, wherein the current security posture relates to compliance of the plurality of computing components in the network with applicable security requirements;
   generating, by the compliance component, a data interchange format object representative of the data indicating the current security posture of the network;

determining, by the compliance component, based on the data interchange format object, that the proposed configuration change results in an overall network configuration that does not comply with one or more of the applicable security requirements;

determining, by the compliance component, a recommendation with respect to the proposed configuration change;

generating, by the compliance component, a notification relating to the determining that the proposed configuration change results in the overall network configuration that does not comply with the one or more of the applicable security requirements, wherein the recommendation is included in the notification; and receiving, by the compliance component, a decision indicating whether to proceed with the proposed configuration change in response to the notification; and performing, by the compliance component, an action based on the decision.

2. The method of claim 1, wherein the recommendation is determined using machine learning techniques based on historical decisions with respect to historical configuration changes.

3. The method of claim 1, wherein the proposed configuration change is determined based on or more of:
an alert; or
a guest introspection operation.

4. The method of claim 1, wherein determining, based on the data interchange format object, that the proposed configuration change results in the overall network configuration that does not comply with the one or more of the applicable security requirements comprises analyzing an architectural impact of the proposed configuration change on an existing configuration of the network.

5. The method of claim 1, wherein performing the action based on the decision comprises one or more of:
recording the decision with associated data;
allowing the proposed configuration change;
blocking the proposed configuration change; or
making one or more additional configuration changes.

6. A non-transitory computer-readable medium comprising instructions that, when executed by one or more processors of a computing system, cause the computing system to perform a method of compliance management, the method comprising:
determining, by a compliance component in a network, a proposed configuration change for the network, wherein the network comprises a plurality of computing components;
prior to modifying the network based on the proposed configuration change:
receiving, by the compliance component, data indicating a current security posture of the network, wherein the current security posture relates to compliance of the plurality of computing components in the network with applicable security requirements;
generating, by the compliance component, a data interchange format object representative of the data indicating the current security posture of the network;
determining, by the compliance component, based on the data interchange format object, that the proposed configuration change results in an overall network configuration that does not comply with one or more of the applicable security requirements;

determining, by the compliance component, a recommendation with respect to the proposed configuration change;

generating, by the compliance component, a notification relating to the determining that the proposed configuration change results in the overall network configuration that does not comply with the one or more of the applicable security requirements, wherein the recommendation is included in the notification; and receiving, by the compliance component, a decision indicating whether to proceed with the proposed configuration change in response to the notification; and performing, by the compliance component, an action based on the decision.

7. The non-transitory computer-readable medium of claim 6, wherein the recommendation is determined using machine learning techniques based on historical decisions with respect to historical configuration changes.

8. The non-transitory computer-readable medium of claim 6, wherein the proposed configuration change is determined based on or more of:
an alert; or
a guest introspection operation.

9. The non-transitory computer-readable medium of claim 6, wherein determining, based on the data interchange format object, that the proposed configuration change results in the overall network configuration that does not comply with the one or more of the applicable security requirements comprises analyzing an architectural impact of the proposed configuration change on an existing configuration of the network.

10. The non-transitory computer-readable medium of claim 6, wherein performing the action based on the decision comprises one or more of:
recording the decision with associated data;
allowing the proposed configuration change;
blocking the proposed configuration change; or
making one or more additional configuration changes.

11. A system comprising one or more processors and a memory comprising instructions that, when executed by the one or more processors, cause the system to perform a method of compliance management, the method comprising:
determining, by a compliance component in a network, a proposed configuration change for the network, wherein the network comprises a plurality of computing components;
prior to modifying the network based on the proposed configuration change:
receiving, by the compliance component, data indicating a current security posture of the network, wherein the current security posture relates to compliance of the plurality of computing components in the network with applicable security requirements;
generating, by the compliance component, a data interchange format object representative of the data indicating the current security posture of the network;
determining, by the compliance component, based on the data interchange format object, that the proposed configuration change results in an overall network configuration that does not comply with one or more of the applicable security requirements;
determining, by the compliance component, a recommendation with respect to the proposed configuration change;

generating, by the compliance component, a notification relating to the determining that the proposed configuration change results in the overall network configuration that does not comply with the one or more of the applicable security requirements, wherein the recommendation is included in the notification; and receiving, by the compliance component, a decision indicating whether to proceed with the proposed configuration change in response to the notification; and performing, by the compliance component, an action based on the decision.

12. The system of claim 11, wherein the recommendation is determined using machine learning techniques based on historical decisions with respect to historical configuration changes.

13. The system of claim 11, wherein the proposed configuration change is determined based on or more of:

an alert; or a guest introspection operation.

14. The system of claim 11, wherein determining, based on the data interchange format object, that the proposed configuration change results in the overall network configuration that does not comply with the one or more of the applicable security requirements comprises analyzing an architectural impact of the proposed configuration change on an existing configuration of the network.

* * * * *